United States Patent
Kurahashi

(10) Patent No.: US 8,936,270 B2
(45) Date of Patent: Jan. 20, 2015

(54) DISPOSITION STRUCTURE FOR CURTAIN AIRBAG SYSTEM

(71) Applicant: Fuji Jukogyo Kabushiki Kaisha, Tokyo (JP)

(72) Inventor: Hiroyuki Kurahashi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/968,803

(22) Filed: Aug. 16, 2013

(65) Prior Publication Data

US 2014/0070522 A1 Mar. 13, 2014

(30) Foreign Application Priority Data

Sep. 7, 2012 (JP) ................................. 2012-196856

(51) Int. Cl.
*B60R 21/213* (2011.01)
*B60R 21/231* (2011.01)
*B60R 21/16* (2006.01)

(52) U.S. Cl.
CPC ......... *B60R 21/213* (2013.01); *B60R 21/23138* (2013.01); *B60R 2021/161* (2013.01)
USPC .................................. 280/730.2; 280/728.2

(58) Field of Classification Search
CPC ............................ B60R 21/213; B60R 21/214
USPC ........................................ 280/728.2, 730.2
See application file for complete search history.

(56) References Cited

U.S. PATENT DOCUMENTS

| 6,254,123 | B1* | 7/2001 | Urushi et al. | 280/730.2 |
| 2006/0082108 | A1* | 4/2006 | Wahara et al. | 280/730.2 |
| 2007/0132217 | A1* | 6/2007 | Seong | 280/730.2 |
| 2007/0241543 | A1* | 10/2007 | Jang et al. | 280/730.2 |
| 2009/0160165 | A1* | 6/2009 | Torii | 280/730.2 |
| 2011/0101656 | A1* | 5/2011 | Kim et al. | 280/730.2 |
| 2011/0115199 | A1* | 5/2011 | Shimazaki et al. | 280/728.2 |
| 2014/0042734 | A1* | 2/2014 | Suga et al. | 280/730.2 |
| 2014/0110922 | A1* | 4/2014 | Uchida | 280/730.2 |

FOREIGN PATENT DOCUMENTS

JP 2008-230474 A 10/2008

OTHER PUBLICATIONS

Mitsuyoshi Ono, Curtain Airbag Device, Oct. 2, 2008, JPO, JP 2008-230474 A, Machine Translation of Description.*

* cited by examiner

*Primary Examiner* — James English
(74) *Attorney, Agent, or Firm* — McGinn IP Law Group, PLLC

(57) ABSTRACT

A disposition structure for a curtain airbag system in which the airbag, when deployed, deforms an end of a roof trim toward the inside of a passenger compartment. An airbag guide support retains an airbag guide in a normal position in which an end of the airbag guide is kept away from an upper end of a pillar trim and a top surface of the airbag guide faces the under surface of the folded airbag. When the airbag is inflated and deployed, the airbag guide receives a downward pressing force from the inflating airbag on the top surface of the airbag guide and moves to a position of action in which the airbag guide covers the upper end of the pillar trim from above.

17 Claims, 8 Drawing Sheets ated as illustrated by virtual lines. When the airbag 101 has been

DISPOSITION STRUCTURE FOR CURTAIN AIRBAG SYSTEM

CROSS-REFERENCE TO RELATED APPLICATIONS

The present application claims priority from Japanese Patent Application No. 2012-196856 filed on Sep. 7, 2012, the entire contents of which are hereby incorporated by reference.

BACKGROUND OF THE INVENTION

1. Field of the Invention

The present invention relates to a disposition structure for a curtain airbag system that deploys an airbag in a vertical direction from a roof side rail in the event of a side impact or a rollover of a motor vehicle.

2. Description of the Related Art

Motor vehicles have recently been equipped with a curtain airbag system that protects an occupant by deploying an airbag in a vertical direction from a roof side rail in the event of a side impact or a rollover.

Such an airbag of the curtain airbag system is retracted in a folded state and disposed at along the roof side rail, and a passenger compartment side of the airbag is covered with an end of a roof trim. In the retracted state, an upper end of a pillar trim, such as a center pillar trim and a quarter pillar trim, is overlaid on an edge of the end of the roof trim from the passenger compartment side.

In the event of the deployment, the curtain airbag system causes the airbag to urge the end of the roof trim toward the inside of the passenger compartment so that the airbag may deploy in a vertical direction through a gap produced between the deformed end and the upper end of a side glass and pillar trim.

However, the pillar trim is typically made of a hard member compared with the roof trim, specifically a hard synthetic resin, in order to prevent deformation or damage caused by being bumped by an occupant or luggage. Such a synthetic resin tends to become harder and easily crack especially at low ambient temperatures. For this reason, an upper end of the pillar trim may be broken when the rapidly inflating airbag hits into the portion. As a result, debris of the pillar trim may be scattered across the compartment.

In order to prevent this problem, Japanese Unexamined Patent Application Publication (JP-A) No. 2008-230474 discloses a curtain airbag system provided with an airbag guide that is deployed so as to cover an upper end of a pillar trim when the airbag is deployed in a vertical direction.

The curtain airbag system disclosed in JP-A No. 2008-230474 is outlined below with reference to FIGS. 7 and 8. FIG. 7 is a schematic side view of a passenger compartment, as seen from the inside of a passenger compartment, where the curtain airbag system is disposed. FIG. 8 is an enlarged sectional view taken along line VIII-VIII of FIG. 7.

As illustrated in FIG. 7, a curtain airbag system 100 mainly includes: an airbag 101 disposed in a folded and retracted state along a roof side rail 115 over the range of a front pillar 111; a center pillar 112; a quarter pillar 114; and an inflator (not illustrated) that, in the event of a side impact, becomes activated to eject gas.

As illustrated in FIG. 8, the airbag 101 of the curtain airbag system 100 is covered at its passenger compartment side with a downwardly curved end 117A of a roof trim 117 that forms a ceiling of the passenger compartment. An upper end 118A of a pillar trim 118 is overlaid on an edge of the end 117A of the roof trim 117 from the inside of the passenger compartment.

The center pillar 112 mainly includes a pillar inner panel 113 and a center pillar section 115A of a side outer panel 115. A roof side rail 116 extends in a longitudinal direction of a vehicle in the inside of a roof side rail section 115B of the side outer panel 115 and is connected at its passenger compartment side with an upper end of the pillar inner panel 113. An inner edge of the roof side rail section 115B and an outer edge of a roof panel 119 are connected with a combining flange formed at the top of the roof side rail 116.

A mounting wall 118B extending upward toward the outside of the passenger compartment is integrally formed on an upper end 118A of the pillar trim 118 provided in the inside of the center pillar 112. In addition, a mounting unit 118C extending downward toward the outside of the passenger compartment from an upper end of the mounting wall 118B is secured to the pillar inner panel 113 using a clip.

An upper wall 118D is formed so as to extend upward from the upper end of the mounting wall 118B. The airbag 101 in a folded state is provided on a guide wall 118E extending obliquely upward toward the outside of the passenger compartment from an upper end of the upper wall 118D. An airbag guide 120 is provided on the upper wall 118D and is configured to cover the upper end 118A of the pillar trim 118 when an upper end 120A thereof is deformed toward the inside of the passenger compartment.

The airbag 101 in a folded state, when receiving a gas supplied from the inflator, becomes inflated and deployed as illustrated by virtual lines. When the airbag 101 has been deployed, the upper end 120A of the airbag guide 120 is deformed toward the inside of the passenger compartment, covering the upper end 118A of the pillar trim 118, as illustrated by the virtual lines. In addition, when the airbag 101 is deployed, a pressing force arising from the inflating and deploying airbag 101 opens up an end 117A of the roof trim 117 toward the inside of the passenger compartment, as illustrated by the virtual lines.

As described above, when the airbag 101 is deployed, the airbag guide 120 is deformed so as to cover the upper end 118A of the pillar trim 118, thereby preventing the rapidly inflating and deploying airbag 101 from coming into direct contact with the upper end 118A of the pillar trim 118. This technique can prevent damage to the upper end 118A of the pillar trim 118, thereby avoiding debris from scattering.

According to JP-A No. 2008-230474, in the event of the deployment, the airbag 101 uses a pressing force arising from its inflation and deployment to open up the end 117A of the roof trim 117 toward the inside of the passenger compartment. Meanwhile, in the center pillar 112, the pressing force exerted toward the inside of the passenger compartment presses against and deforms the upper end 120A of the airbag guide 120 and consequently expands the upper end 120A of the airbag guide 120 and then opens up the end 117A of the roof trim 117. This results in a reduction in the pressing force to open up the end 117A of the roof trim 117 as well as a delay in pressing to open up the end 117A of the roof trim 117, which locally impedes the inflation and deployment of the airbag 101 and produces a temporal variation in the inflation and deployment of the airbag 101, degrading a smooth inflation and deployment of the airbag 101. Also, this may exert a negative effect on the deployment, including a delay in time during which the airbag 101 is deployed.

SUMMARY OF THE INVENTION

The present invention has been designed in consideration of the circumstances described above, and an object thereof is to provide a disposition structure for a curtain airbag system that allows a smooth deployment of an airbag.

A first aspect of the present invention provides a disposition structure for a curtain airbag system. The disposition structure for a curtain airbag system includes: an airbag in a folded state disposed along a roof side rail; a roof trim that forms a ceiling and covers the folded airbag with an end thereof; a pillar trim that covers a passenger compartment side of a pillar; a plate-like airbag guide that has a top surface facing an under surface of the folded airbag and has an end thereof directed toward the inside of the passenger compartment; and an airbag guide support that retains the airbag guide in a normal position in which the end of the airbag guide is kept away from the upper end of the pillar trim and the top surface of the airbag guide faces the under surface of the folded airbag and that, when the airbag is inflated and deployed, the airbag guide receives a downward pressing force from the inflating airbag on the top surface of the airbag guide and moves to a position of action in which the airbag guide guides the inflating and deploying airbag to a non-contact state in which the airbag is kept away from the upper end of the pillar trim. When the airbag is inflated, it presses and deforms the end of the roof trim toward the inside of the passenger compartment and thereby produces a gap between the end of the roof trim and an upper end of the pillar trim through which the airbag is deployed in a vertical direction.

Accordingly, when the airbag is inflated and deployed, the inflating airbag presses the end of the roof trim toward the inside of the passenger compartment and at the same time exerts a downward pressing force on the top surface of the airbag guide, which causes the airbag guide to be moved from the normal position to the position of action in which the airbag guide guides the inflating airbag to the non-contact state in which the airbag is kept away from the upper end of the pillar trim. This prevents the rapidly inflating airbag from coming into contact with the upper end of the pillar trim, thereby preventing damage to the upper end of the pillar trim.

Also, when the airbag is inflated and deployed, the pressing force that presses the end of the roof trim toward the inside of the passenger compartment directly acts on and opens up the end of the roof trim with receiving no influence from a pressing force that presses down the airbag guide, thereby allowing a smooth and uniform inflation and deployment of the airbag with no impediment over the entire length of the airbag as well as ensuring a rapid inflation and deployment.

Preferably, the airbag guide in the position of action may cover the upper end of the pillar trim with an end thereof from above. This is the specific position of action of the airbag guide in which the airbag guide may cover the upper end of the pillar trim with the end thereof from above, thereby ensuring that the airbag, when deployed, is prevented from coming into the upper end of the pillar trim.

Preferably, the airbag guide in the position of action may have the end thereof located in a position outside of the upper end of the pillar trim and have the top surface thereof located at a level equal to or above an upper edge of the upper end of the pillar trim.

This is the specific position of action of the airbag guide in which the end of the airbag guide may be located in the outside of the passenger compartment away from the upper end of the pillar trim and the top surface may be located at a level equal to or above the upper edge of the upper end of the pillar trim, thereby ensuring that the airbag, when deployed, is prevented from coming into the upper end of the pillar trim.

Preferably, the airbag guide in the position of action may have the end thereof that is located in a position outside of the upper end of the pillar trim and is set below the upper edge of the upper end of the pillar trim that guides the deployed airbag to the non-contact state in which the airbag is kept away from the upper end of the pillar trim.

This is the specific position of action of the airbag guide in which the end of the airbag guide may be located outside the passenger compartment away from the upper end of the pillar trim and the top surface may be located below the upper edge of the upper end of the pillar trim. Specifically, the end of the airbag guide may be set below the upper edge of the upper end of the pillar trim that guides the deployed airbag to the non-contact state in which the airbag is kept away from the upper end of the pillar trim, thereby preventing the deployed airbag from coming into contact with the upper end of the pillar trim.

Preferably, the airbag guide support may include a end guide unit, having a support extending toward the outside of the passenger compartment from the pillar trim and another end guide unit that upward extends toward the inside of the passenger compartment via a hinge at an end of the support and is connected at an end thereof with the end of the airbag guide via a hinge, and an underside guide unit that is connected at its proximal end with the pillar and has a contact area at an end thereof which is able to be in sliding contact with the underside of the airbag guide.

Accordingly, the airbag guide support may be simplified to include a distal-end guide unit having a support extending toward the outside of the passenger compartment from the pillar trim and a distal-end guide that upward extends toward the inside of the passenger compartment via a hinge at an end of the support and is connected at an end thereof with the end of the airbag guide via a hinge, and an underside guide unit that is connected at its proximal end with the pillar and has a contact area at an end thereof which is able to be in sliding contact with the underside of the airbag guide.

Preferably, the end guide unit and the airbag guide may be formed integrally with the pillar trim. Forming the end guide unit and the airbag guide integrally with the pillar trim reduces the number of components and simplifies assembly and control.

According to the present invention, when the airbag is inflated and deployed, the inflating airbag exerts a downward pressing force on the airbag guide, which causes the airbag guide to be moved from the normal position to the position of action in which the airbag guide guides the inflating airbag to the non-contact state in which the airbag is kept away from the upper end of the pillar trim. This prevents the rapidly inflating airbag from coming into contact with the upper end of the pillar trim, thereby preventing damage to the upper end of the pillar trim.

Also, when the airbag is inflated and deployed, the pressing force that presses the end of the roof trim toward the inside of the passenger compartment directly acts on and opens up the end of the roof trim with receiving no influence from a pressing force that presses down the airbag guide, thereby allowing a smooth and uniform inflation and deployment of the airbag with no impediment over the entire length of the airbag as well as ensuring a rapid inflation and deployment.

DESCRIPTION OF THE PREFERRED EMBODIMENTS

First Embodiment

Figure 1:
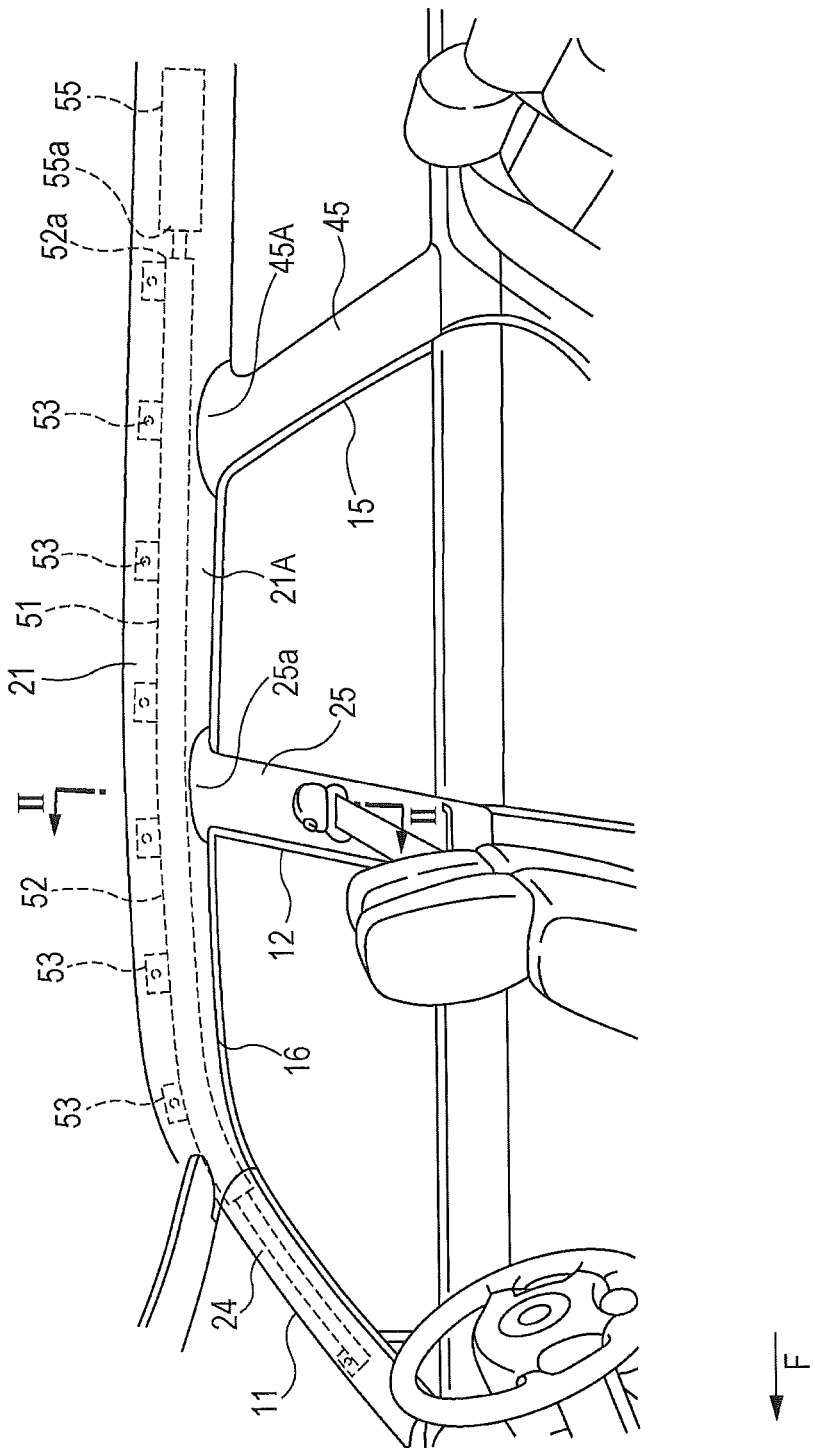
FIG. 1 is a schematic view of a passenger compartment seen from the inside of the passenger compartment, illustrating an outline of a disposition structure of a curtain airbag system according to a first embodiment of the present invention.
Figure 2:
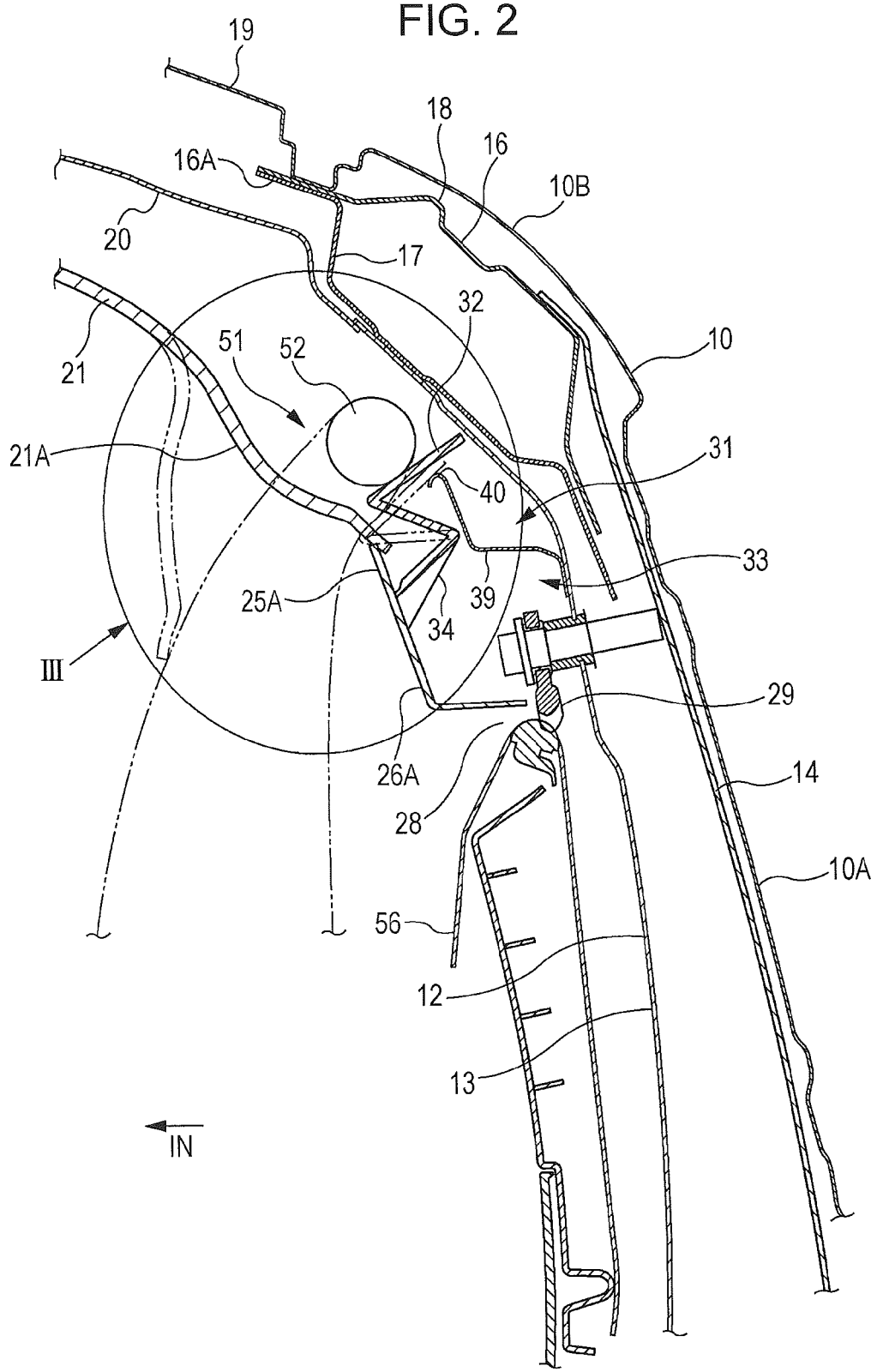
FIG. 2 is an enlarged sectional view taken along the line II-II of FIG. 1.
Figure 3:
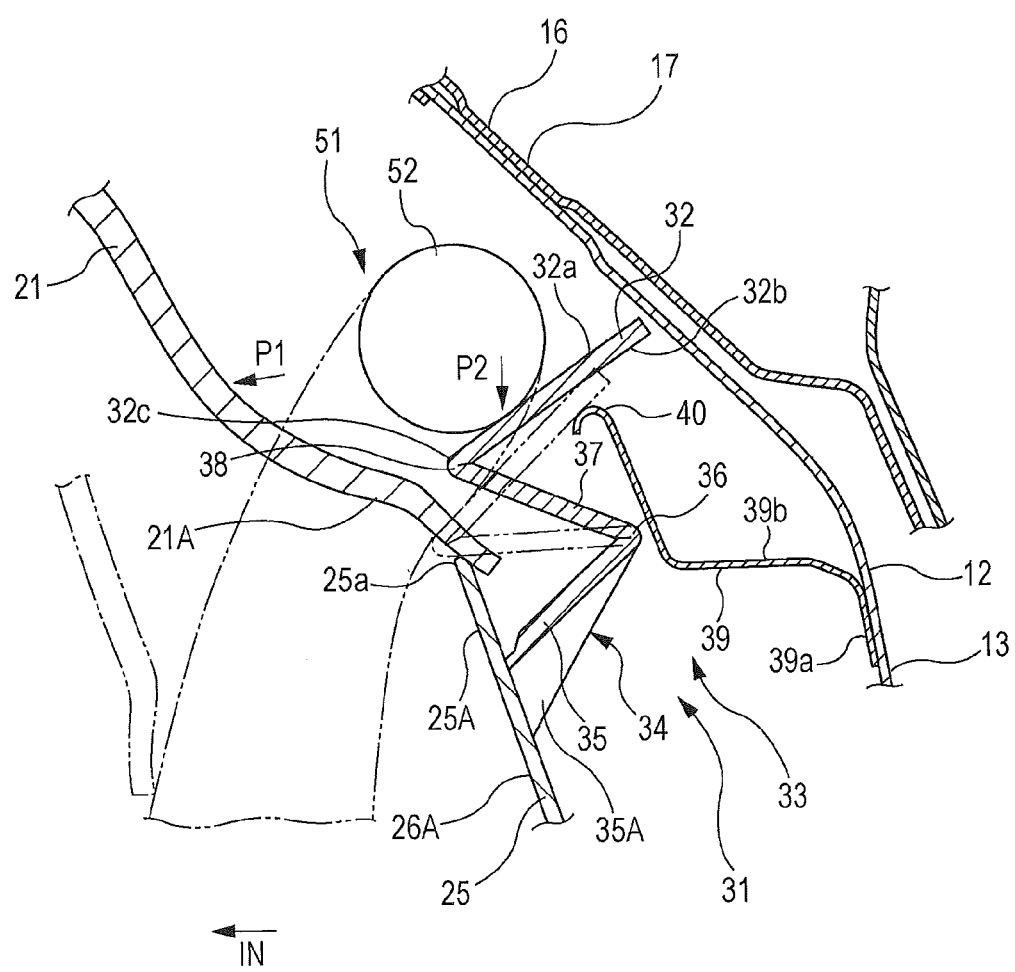
FIG. 3 is an enlarged view of the portion III of FIG. 2.
Figure 4:
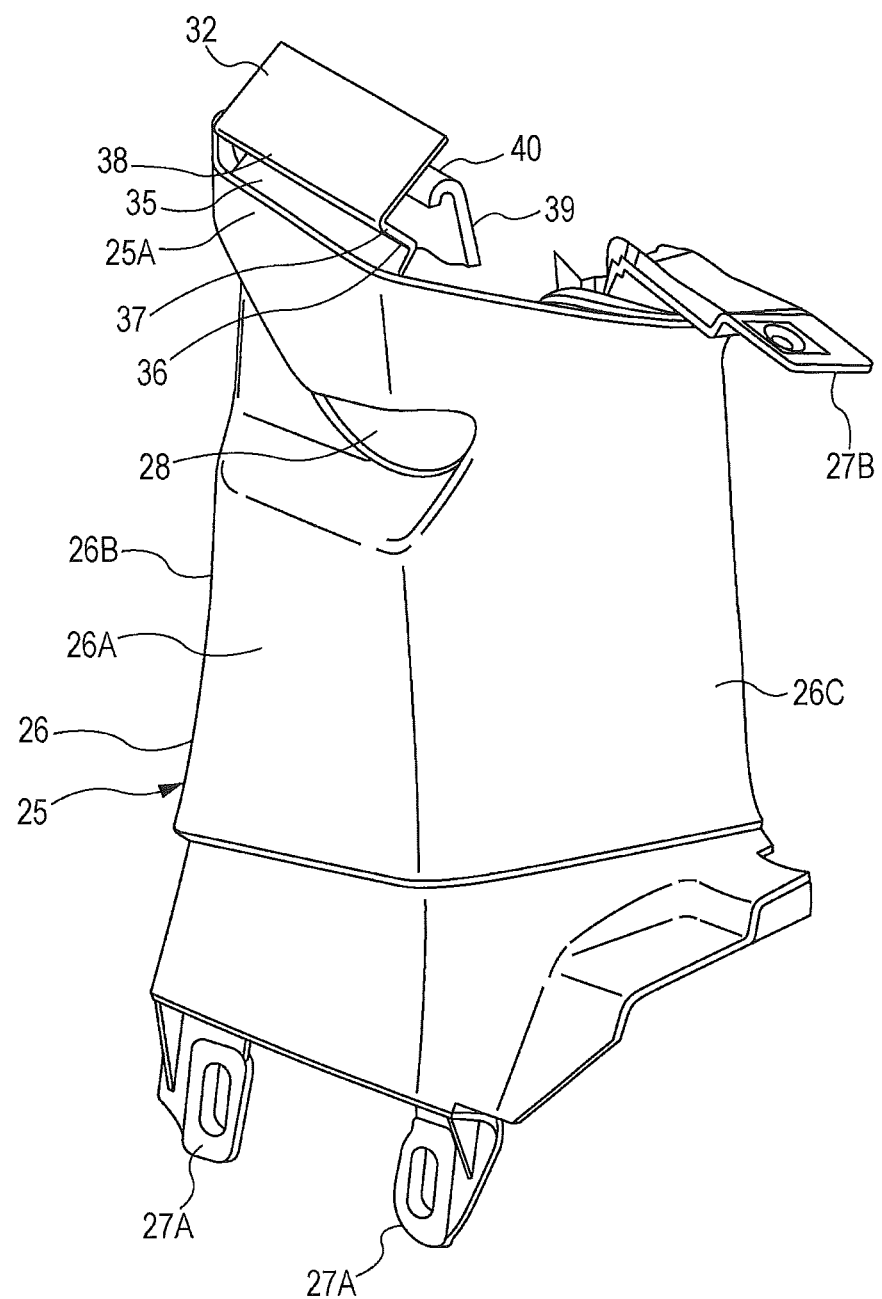
FIG. 4 is an exploded perspective view of a main part of FIG. 3.

A first embodiment according to the present invention is described below with reference to the attached drawings. FIG. 1 is a schematic view of a passenger compartment side, as seen from the inside of a passenger compartment, illustrating an outline of a disposition structure of a curtain airbag system. FIG. 2 is an enlarged sectional view taken along the line II-II of FIG. 1. FIG. 3 is an enlarged view of the portion III of FIG. 2. FIG. 4 is an exploded perspective view of a main part. In these figures, an arrow "F" indicates a forward direction of the vehicle, while an arrow "IN" indicates a laterally inward direction of the vehicle.

As illustrated in FIG. 1, a front pillar (A pillar) 11, a center pillar (B pillar) 12, a quarter pillar (C pillar) 15, a rear pillar (D pillar)(not illustrated) are disposed in that order from front to rear in a side of a passenger compartment in which the front pillar 11, the center pillar 12, the quarter pillar 15, and the rear pillar are connected at their upper portions to a roof side rail 16 extending in a longitudinal direction of the vehicle.

A curtain airbag system 51 according to this embodiment consists mainly of an airbag 52 that is folded into a retracted state so as to be disposed along the roof side rail 16 within a range from the front pillar 11 to the center pillar 12 to the quarter pillar 15 and a substantially cylindrically-shaped inflator 55 that is connected to a lengthwise rear end of the airbag 52 and is actuated to eject gas in the event of a side impact and a rollover.

The airbag 52 has mounting pieces 53 that are formed at its upper edge and spaced at predetermined intervals. The mounting pieces 53 are attached to the roof side rail 16. The inflator 55 for inflating and deploying the airbag 52 is attached and fixed to the roof side rail 16 with a bracket or the like therebetween. A gas ejector 55a of the inflator 55 is connected with a rear end 52a of the airbag 52. The inflator 55 is connected to an airbag ECU (not illustrated) and is activated to generate gas when a side impact sensor or a rollover sensor senses a side impact or a rollover condition.

As illustrated in FIGS. 2 and 3, the airbag 52 of the curtain airbag system 51 is covered from the inside of the passenger compartment with a center pillar trim 25 and an end 21A of a roof trim 21 forming a ceiling of the passenger compartment. In other words, the airbag 52 that is folded into a retracted state is housed along the inside of the end 21A of the roof trim 21.

In the retracted state, an upper end 25A of the center pillar trim 25 disposed on the center pillar 12 and an upper end 45A of a quarter pillar trim 45 disposed on the quarter pillar 15 are disposed so as to be overlaid on an edge of the end 21A of the roof trim 21 from the inside of the passenger compartment.

The center pillar 12 is formed into a vertically extending closed cross-section shape by a pillar inner panel 13 having a substantially hat-shaped cross section which is disposed so as to vertically extend inside the passenger compartment and a center pillar 10A of a side outer panel 10 which is disposed so as to extend vertically outside the passenger compartment. A pillar reinforcement 14 is disposed between the pillar inner panel 13 and the center pillar 10A so as to vertically extend along the center pillar 10A.

The roof side rail 16 has a closed cross-section structure composed of a side rail inner panel 17 having a hat-shaped cross section which is disposed inside the passenger compartment and a side rail outer panel 18 that is disposed outside the passenger compartment. The pillar inner panel 13 is secured at an upper end 13A thereof to the side rail inner panel 17. The pillar reinforcement 14 is secured at an upper end thereof to the side rail outer panel 18.

A laterally inner end of a side rail outer 10B of the side outer panel 10 and a laterally outer end of a rood panel 19 are connected with a combining flange 16A formed at the top of the roof side rail 16. A brace 20 laterally extending along an underside of the roof panel 19 is connected at a lateral end thereof with an inner side of the side rail inner panel 17.

As illustrated in a cross-sectional view of FIGS. 2 and 3 and in a perspective view of FIG. 4, the center pillar trim 25 has a base 26 having a substantially C-shaped cross section which has an inner side 26A facing a passenger compartment side of the center pillar 12, a front side 26B facing a front side of the center pillar 12, and a rear side 26C facing a rear side of the center pillar 12. Also, the center pillar trim 25 has the upper end 25A formed at an upper end thereof, which is overlaid on the end 21A of the roof trim 21 from the inside of the passenger compartment. Furthermore, the front side 26B has a mounting unit 27A formed at a lower end thereof, which is secured to the pillar inner panel 13 of the center pillar 12 using a clip or the like. In addition, the rear side 26C has a mounting unit 27B formed at an upper end thereof, which is secured to the side rail inner panel 17 using a clip or the like.

The center pillar trim 25 has a belt insertion hole 28 formed in the inner side 26A, through which a seat belt webbing 56, after being drawn out from a retractor of a seat belt device (not illustrated) and turning at a through ring 29, is guided into the passenger compartment. Description of the seat belt device is omitted since it is not relevant to the present invention.

An airbag guide unit 31, including an airbag guide 32 and an airbag guide support 33 constructed of an end guide unit 34 for controlling a movement of the airbag guide 32 and an underside guide unit 39, is disposed in the vicinity of the upper end 25A of the center pillar trim 25.

The airbag guide 32, which can extend substantially horizontally between the upper end 25A of the center pillar trim 25 and the center pillar inner panel 13, includes a rectangular plate having a top surface 32a and an under surface 32b, the top surface 32a facing an underside of the airbag 52 folded in a retracted state, and an end 32c facing the end 21A of the roof trim 21 is integrally connected to an end guide 37 of the end guide unit 34 to be described later via a thin-walled, flexible resin hinge or so-called self-hinge 38.

The end guide unit 34 has a substantially plate-like support 35, which is located below the upper end 25A of the center pillar trim 25 and extends obliquely upward toward the outside of the passenger compartment from the inner side 26A, and is provided with a reinforcement rib 35A that provides a direct connection between an underside of the support 35 and the inner side 26A. The support 35 is connected at an end thereof with the plate-like end guide 37 extending upward toward the passenger compartment via a flexible thin-walled self-hinge 36 extending longitudinally. In addition, the end guide 37 is integrally connected at an end thereof with the end 32c of the airbag guide 32 via a flexible thin-walled self-hinge 38 extending longitudinally.

The underside guide unit 39 is a bent plate having a substantially crank-like cross section and has a base 39a connected with the pillar inner panel 13, a main section 39b that extends from the base 39a and bends toward the passenger compartment so as to separate from the pillar inner panel 13 and further bends upward so as to approach and face an end of the support 35 of the end guide unit 34, and a longitudinally extending contact area 40 having an arc-like cross section which is located at an upper end of the main section 39b so as to face the underside of the airbag 52 in a folded state with a gap therebetween.

As illustrated in FIG. 3, in a normal state in which the top surface 32a of the airbag guide 32 faces the underside of the airbag 52 in a folded state, the end 32c of the airbag guide 32 faces the end 21A of the roof trim 21 with a gap therebetween in a position above the upper end 25A of the center pillar trim 25, while the under surface 32b of the airbag guide 32 faces the contact area 40 formed on the underside guide unit 39 with a gap therebetween.

When, as a result of the deployment of the airbag 52, a pressing force P2 directed downward is exerted on the top surface 32a of the airbag guide 32, the airbag guide 32 is pressed down by the pressing force P2, which causes the under surface 32b of the airbag guide 32 to come into contact with the contact area 40 of the underside guide unit 39, as illustrated by virtual lines. At this time, the end 32c is guided downward by the end guide 37 turning downward about the self-hinge 38 toward the passenger compartment to an upper end 25a of the upper end 25A of the center pillar trim 25 so as to cover the upper end 25A of the center pillar trim 25 from above. Consequently, the end 32c is retained by a position of action at which contact with the upper end 25A is obtained, namely, a position of action in which the airbag guide 32 has guided the inflating and deploying airbag 52 to a non-contact state in which the airbag 52 is kept away from the upper end 25A of the center pillar trim 25.

The quarter pillar trim 45 disposed on the quarter pillar 15 also has an air bag guide section having the same configuration and function as those of the airbag guide section 31, though its description is omitted.

Figure 5:
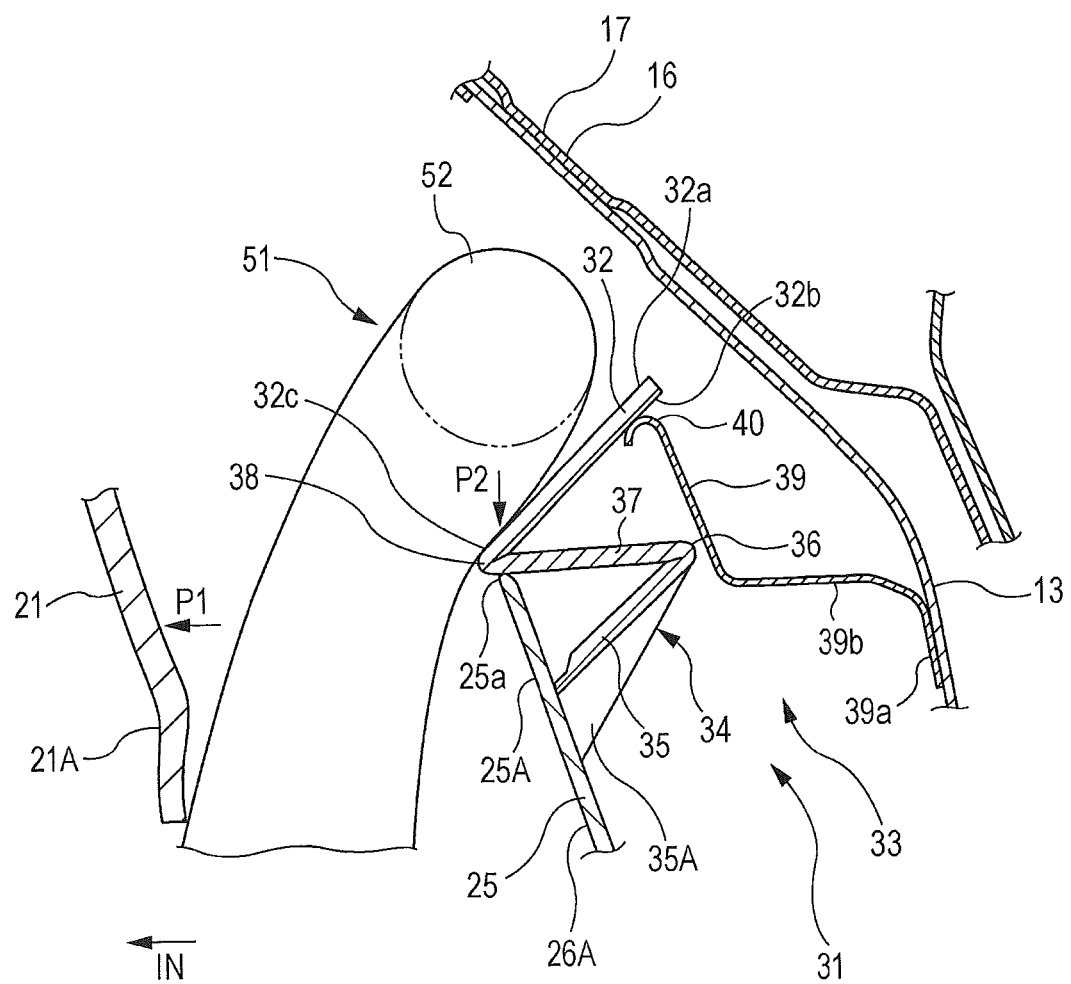
FIG. 5 is a cross-sectional view illustrating a state where an airbag is deployed.

Next, operation of this embodiment is described below with reference to FIG. 3 and FIG. 5 illustrating a state where an airbag is deployed.

If a side impact or rollover is sensed by a side impact sensor or rollover sensor (not illustrated) of a vehicle, a signal is sent from the side impact sensor or rollover sensor to the inflator 55 which in turn becomes activated to eject gas into the airbag 52. The inflating airbag 52 generates the pressing force P1 directed toward the passenger compartment, opening the end 21A of the roof trim 21 toward the inside of the passenger compartment over the substantially entire length from the front pillar 11 to the rear of the quarter pillar 15.

Meanwhile, when the airbag 52 is inflated and deployed, the pressing force P2 directed downward, which is different in direction from the pressing force P1 pressing the end 21A of the roof trim 21 toward the inside of the passenger compartment, depresses the airbag guide 32 of the airbag guide section 31 disposed at the center pillar trim 25. As illustrated by virtual lines of FIG. 3 and in FIG. 5, the thus depressed airbag guide 32 causes the under surface 32b to come into contact with the contact area 40 of the underside guide unit 39. At this time, the end 32c is guided downward by the end guide 37 turning downward about the self-hinge 38 toward the passenger compartment to an upper end 25a of the upper end 25A of the center pillar trim 25 so as to cover the upper end 25A of the center pillar trim 25 from above, as illustrated in FIG. 5. Consequently, the end 32c is retained by the position of action at which contact with the upper end 25A is obtained. Likewise, the airbag guide 32 disposed at the quarter pillar trim 45 also moves to a position of action so as to cover the upper end 45A of the quarter pillar trim 45.

As described above, when the airbag 52 is deployed, the upper end 25A of the center pillar trim 25 is covered with the slanted airbag guide 32 from above. Likewise, the upper end 45A of the quarter pillar trim 45 is covered with an airbag guide from above. This arrangement prevents the rapidly inflating airbag 52 from coming into direct contact with the upper end 25A of the center pillar trim 25 and the upper end 45A of the center pillar trim 45, allowing the airbag 52 to be inflated and deployed in the passenger compartment through a gap between the end 21A of the roof trim 21 deformed by an inflating force of the airbag 52 and the upper end 25A of the center pillar trim 25 covered with a side glass and the airbag guide 32 and the upper end 45A of the quarter pillar trim 45 covered with the airbag guide 32 from above, as illustrated in FIG. 5.

As described above, when the airbag 52 is deployed, the upper end 25A of the center pillar trim 25 covered with the airbag guide 32 and the upper end 45A of the quarter pillar trim 45 covered with the airbag guide prevent the rapidly inflating airbag 52 from coming into direct contact with the upper end 25A of the center pillar trim 25 and the upper end 45A of the center pillar trim 45, thereby preventing damage to the upper end 25A of the center pillar trim 25 and the upper end 45A of the quarter pillar trim 45 as well as avoiding possible flying debris.

When the airbag 52 is inflated and deployed, the inflating force of the airbag 52, particularly the pressing force P1 that presses the end 21A of the roof trim 21 toward the passenger compartment is different in direction from the pressing force P2 that presses down the airbag guide 32, directly acting on the end 21A of the roof trim 21 with receiving no influence from the pressed-down airbag guide 32 and opening the end 21A of the roof trim 21, thereby allowing a smooth and uniform inflation and deployment of the airbag 52 over the entire length of the airbag 52 as well as ensuring a rapid inflation and deployment.

Also, the end guide unit 34 and the airbag guide 32 are formed integrally with the center pillar trim 25, resulting in a reduction of the number of components and simplified assembly and control.

Second Embodiment

Figure 6:
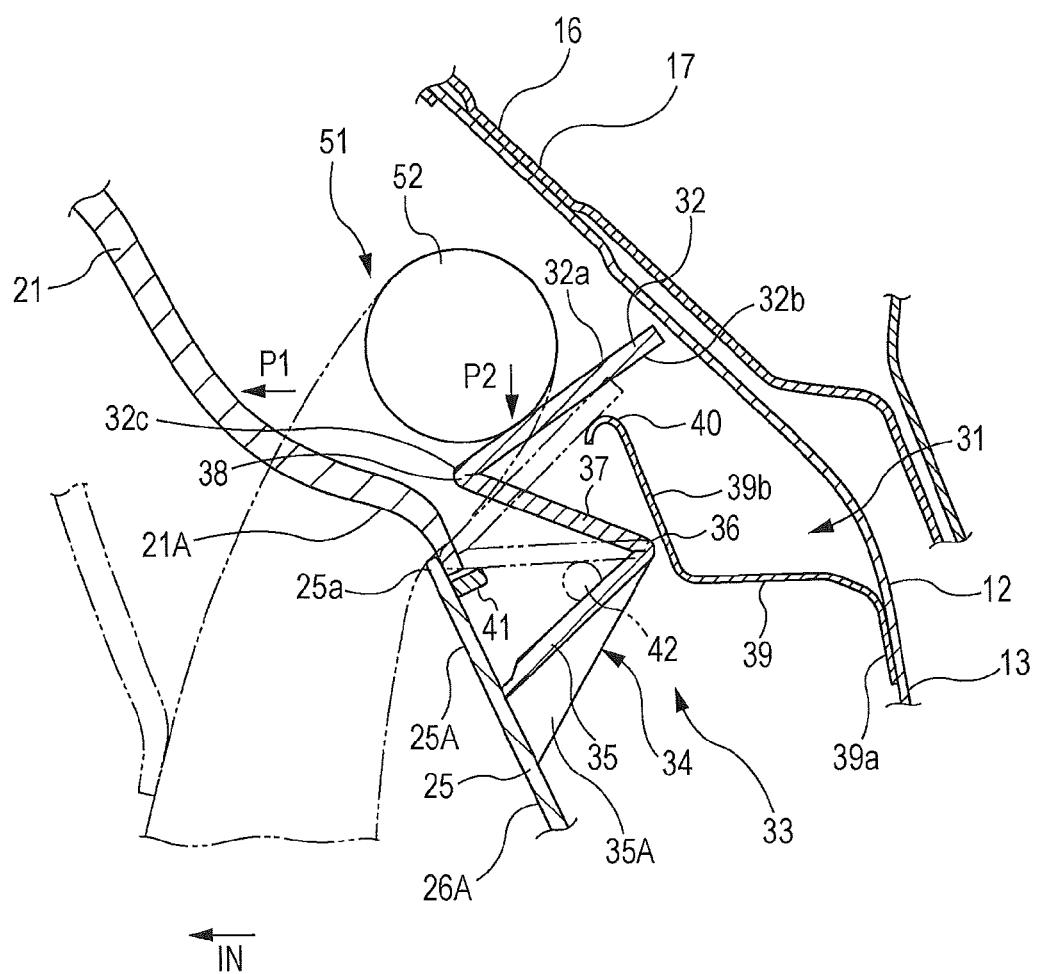
FIG. 6 is a schematic cross-sectional view illustrating an outline of a second embodiment.
Figure 7:
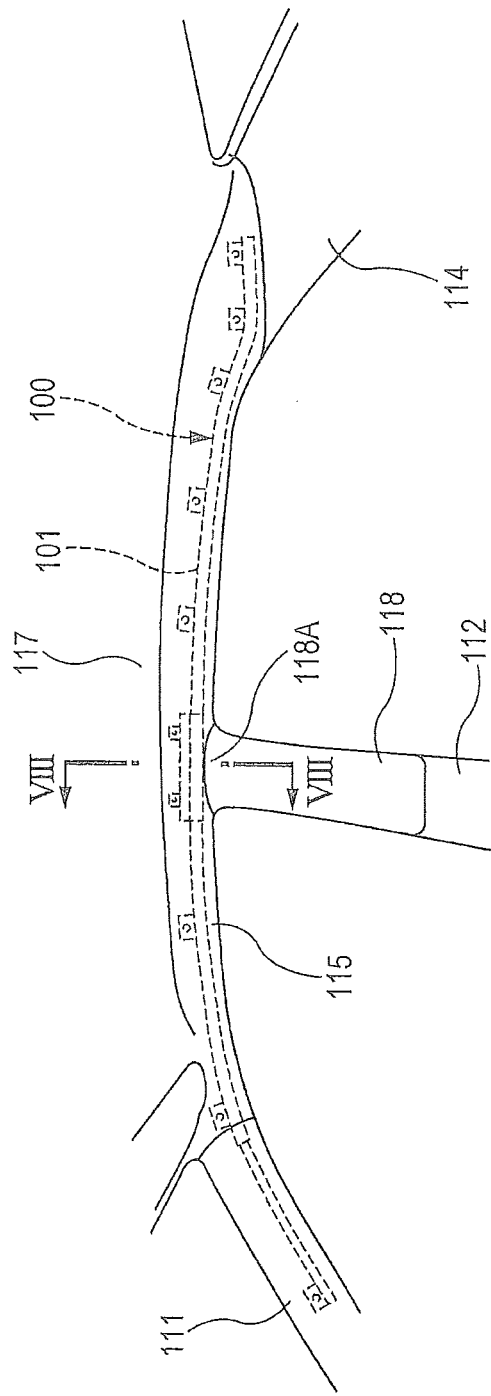
FIG. 7 is a schematic view of a passenger compartment seen from the inside of a passenger compartment, illustrating a vehicle structure provided with a conventional curtain airbag system.
Figure 8:
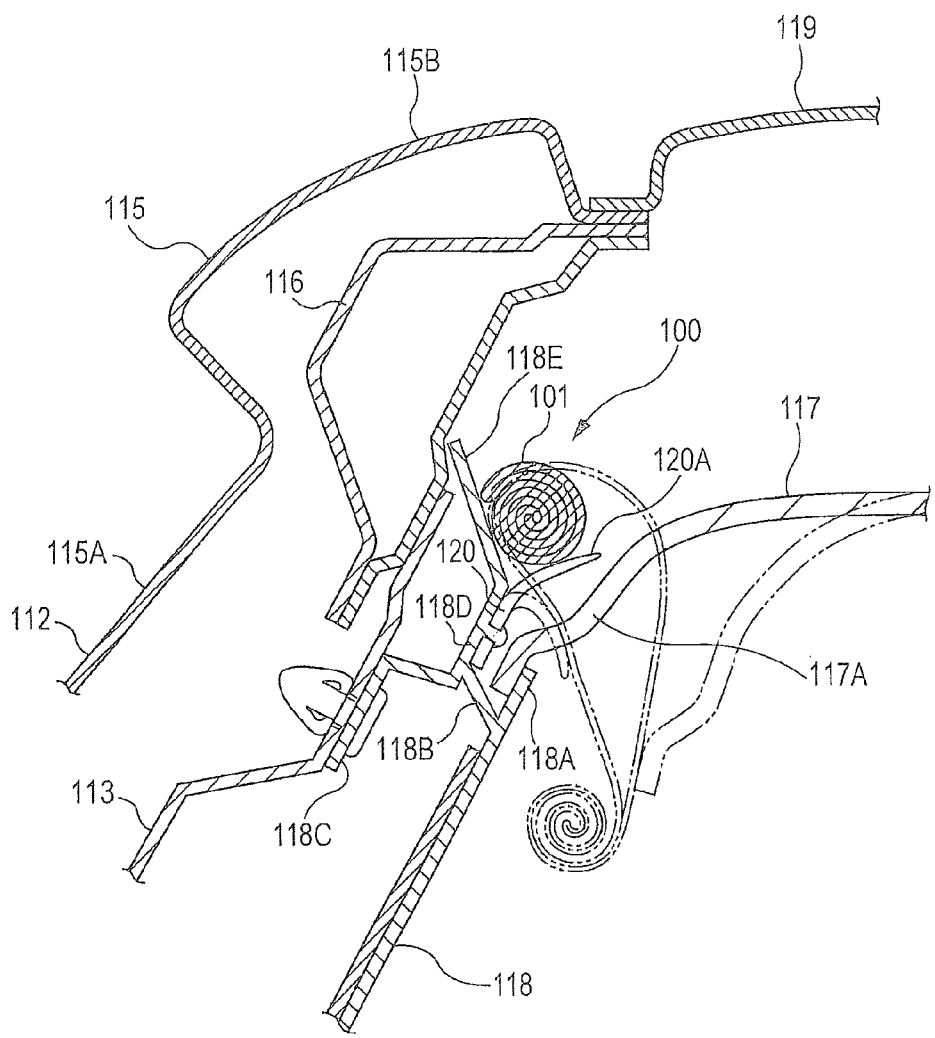
FIG. 8 is an enlarged sectional view taken along the line VIII-VIII of FIG. 7.

A second embodiment according to the present invention is described below with reference to FIG. 6. The reference numerals and symbols in the second embodiment refer to the same components as those with the same reference numerals and symbols in the first embodiment, and repeated descriptions of the same components are omitted. FIG. 6 is a cross-sectional view corresponding to FIG. 3 of the first embodiment.

As illustrated in FIG. 6, an airbag guide section 31, consisting of a plate-like airbag guide 32 and an airbag guide support 33 constructed of an end guide unit 34 for controlling a movement of the airbag guide 32 and an underside guide unit 39, is disposed in the vicinity of an upper end 25A of a center pillar trim 25.

The airbag guide 32 is a rectangular plate having a top surface 32a and an under surface 32b, the top surface 32a facing and being in contact with or in sliding contact with an underside of the airbag 52, and an end 32c facing the end 21A of the roof trim 21 is integrally connected to an end guide 37 of the end guide unit 34 via a self-hinge 38.

The end guide unit 34 has a substantially rectangular plate-like support 35, which is located below the upper end 25A of the center pillar trim 25 and extends obliquely upward toward the outside of the passenger compartment from the inner side 26A. The support 35 is connected at an end thereof via a self-hinge 36 to a rectangular plate-like end guide 37 which extends upward toward the inside of the passenger compartment. The end guide 37 is integrally connected at an end thereof to the end 32c of the airbag guide 32 via the self-hinge 38. A stopper 41 extending from an inner side 26A toward the outside of the passenger compartment is provided in a position which is located between the support 35 and an upper end 25a of the upper end 25A of the center pillar trim 25.

The underside guide unit 39 has a base 39a connected with a pillar inner panel 13, a main section 39b that extends from the base 39a and bends toward the passenger compartment and further bends upward, and a contact area 40 which is located at an upper end of the main section 39b so as to face the underside of the airbag 52 in a folded state with a gap therebetween.

In a normal state in which the top surface 32a of the airbag guide 32 is in contact with the underside of the airbag 52 in a folded state, the end 32a of the airbag guide 32 faces the end 21A of the roof trim 21 with a gap therebetween in a position above the upper end 25A of the center pillar trim 25, while the under surface 32b of the airbag guide 32 faces the contact area 40 formed on the underside guide unit 39 with a gap therebetween.

When, as a result of the deployment of the airbag 52, a pressing force P2 directed downward is exerted on the top surface 32a of the airbag guide 32, the airbag guide 32 is pressed down by the pressing force P2, which causes the under surface 32b of the airbag guide 32 to come into contact with the contact area 40 of the underside guide unit 39, as illustrated by virtual lines of FIG. 6. At this time, the end 32c is guided downward by the end guide 37 turning downward about the self-hinge 38 toward the passenger compartment to the upper end 25A of the center pillar trim 25. Consequently, the end 32c is retained by a position of action at which contact with the stopper 41 formed on the center pillar trim 25 is obtained.

When the end 32c is retained by the position of action at which contact with the stopper 41 is obtained, the top surface 32a of the airbag guide 32 is held at a level that is equal to or above the upper end 25a of the upper end 25A of the center pillar trim 25. The quarter pillar trim 45 disposed on the quarter pillar 15 also has an air bag guide section 31 having the same configuration and function as those of the airbag guide section 31, though its description is omitted.

Next, operation of this embodiment is described below.

If a side impact or rollover is sensed by a side impact sensor or rollover sensor (not illustrated) of a vehicle, the inflator 55 becomes activated to eject gas into the airbag 52. The thus injected gas inflates the airbag 52, opening the end 21A of the roof trim 21 toward the inside of the passenger compartment over the substantially entire length from the front pillar 11 to the rear of the quarter pillar 15.

Meanwhile, when the airbag 52 is inflated and deployed, the pressing force P2 directed downward, which is different in direction from the pressing force P1 pressing the end 21A of the roof trim 21 toward the inside of the passenger compartment, depresses the airbag guide 32 of the airbag guide section 31 disposed at the center pillar trim 25. As illustrated by virtual lines of FIG. 6, the thus depressed airbag guide 32 causes the under surface 32b to come into contact with the contact area 40 of the underside guide unit 39. At this time, the end 32c is guided downward by the end guide 37 turning downward about the self-hinge 38 toward the passenger compartment to an upper end 25a of the upper end 25A of the center pillar trim 25. Consequently, the end 32c comes into contact with the stopper 41 formed on the center pillar trim 25, putting the inflating and deploying airbag 52 in a position of action in which the airbag 52 is guided to a non-contact state in which the airbag 52 is kept away from the upper end 25A of the center pillar trim 25. Likewise, the airbag guide 32 is retained by a position of action at the upper end 45A of the quarter pillar trim 45.

As described above, when the airbag 52 is deployed, the slanted airbag guide 32 is disposed at a level equal to or higher than the upper end 25a of the upper end 25A so as to be close to the upper end 25A of the center pillar trim 25. Likewise, the airbag guide 32 is disposed close to the upper end 45A of the quarter pillar trim 45. This arrangement prevents the rapidly inflating airbag 52 from coming into direct contact with the upper end 25A of the center pillar trim 25 and the upper end 45A of the center pillar trim 45, allowing the airbag 52 to be inflated and deployed in the passenger compartment through a gap between the end 21A of the deformed roof trim 21 and a side glass and the upper end 25A of the center pillar trim 25 and the upper end 45A of the quarter pillar trim 45, as illustrated by virtual lines of FIG. 6.

This prevents the rapidly inflating airbag 52 from coming into direct contact with the upper end 25A of the center pillar trim 25 and the upper end 45A of the center pillar trim 45, thereby preventing damage to the upper end 25A of the center pillar trim 25 and the upper end 45A of the quarter pillar trim 45 as well as avoiding possible flying debris.

When the airbag 52 is inflated and deployed, the inflating force of the airbag 52, particularly the pressing force P1 that presses the end 21A of the roof trim 21 toward the passenger compartment directly acts on the end 21A of the roof trim 21 with receiving no influence from the pressed-down airbag guide 32 and opens the end 21A of the roof trim 21, thereby allowing a smooth and uniform inflation and deployment of the airbag 52 as well as ensuring a rapid inflation and deployment.

In the above embodiment, the top surface 32a of the airbag guide 32 in the position of action in which contact with the stopper 41 is obtained is configured to be held at a level that is equal to or above the upper end 25a of the upper end 25A of the center pillar trim 25, but the top surface 32a of the airbag guide 32 in the position of action may be configured to be held slightly below the upper end 25a of the upper end 25A as long as the inflating and deploying airbag 52 is guided to a non-contact state in which the airbag 52 is kept away from the upper end 25A of the center pillar trim 25.

Also, in the above embodiment, the stopper 41 is disposed in the vicinity of the upper end 25A of the center pillar trim 25 so as to retain the end 32c of the airbag guide 32, but a stopper 42 may be provided on the support 35 so as to be able to come into contact with an underside of the end guide 37, as illustrated by virtual lines of FIG. 6. In this case, contact of the end guide 37 with the stopper 42 allows the airbag guide 32 to be retained in the position of action.

The present invention is typically described with reference to, but not limited to, the foregoing preferred embodiments. Various modifications are conceivable within the scope of the present invention. For example, the airbag guide may be disposed only at the center pillar trim according to the specification of the vehicle, though the airbag guide is disposed both at the center pillar trim and the quarter pillar trim in the above embodiment. In addition, other member, for example, a guide rail for guiding the airbag guide from its normal position to the position of action is used to construct the airbag guide support, though the airbag guide support for guiding the airbag guide from its normal position to the position of action is constructed of the end guide unit and the underside guide unit in the above embodiment.

What is claimed is:

1. A disposition structure for a curtain airbag system, the disposition structure comprising:
   an airbag in a folded state disposed along a roof side rail;
   a roof trim that forms a ceiling and covers a folded airbag with an end thereof;
   a pillar trim that covers a passenger compartment side of a pillar;
   an airbag guide that includes a top surface facing an under surface of the folded airbag, an end of the airbag guide being directed toward an inside of a passenger compartment; and
   an airbag guide support that is configured to control a movement of the airbag guide, and is formed to bend toward the passenger compartment so as to separate from the pillar, the airbag guide support being bent upward so as to approach and face the end of the airbag guide,
   wherein the airbag guide support retains the airbag guide in a normal position,
   wherein the end of the airbag guide is kept away from an upper end of the pillar trim and the top surface of the airbag guide faces the under surface of the folded airbag,
   wherein, when the airbag is inflated and deployed, the airbag guide receives a downward pressing force from an inflating airbag on the top surface of the airbag guide and moves to a position of action in which the airbag guide guides the inflating airbag to a non-contact state in which the airbag is kept away from the upper end of the pillar trim, and
   wherein, when the airbag is inflated and deployed, the airbag presses and deforms the end of the roof trim toward the inside of the passenger compartment and thereby produces a gap between the end of the roof trim and the upper end of the pillar trim through which the airbag is deployed in a vertical direction.

2. The disposition structure for the curtain airbag system according to claim 1, wherein the airbag guide in the position of action is configured to cover the upper end of the pillar trim from above.

3. The disposition structure for the curtain airbag system according to claim 1, wherein the airbag guide in the position of action has the end thereof located in a position outside of the upper end of the pillar trim and has the top surface thereof located at a level equal to or above an upper edge of the upper end of the pillar trim.

4. The disposition structure for the curtain airbag system according to claim 1, wherein the airbag guide support includes an end guide unit including a support extending toward an outside of the passenger compartment from the pillar trim and another end guide unit that extends upward toward the inside of the passenger compartment via a hinge at an end of the support and is connected at an end thereof with the end of the airbag guide via the hinge, and an underside guide unit that is connected at its proximal end with the pillar and includes a contact at an end thereof which is able to be in sliding contact with the under surface of the airbag guide.

5. The disposition structure for the curtain airbag system according to claim 2, wherein the airbag guide support includes an end guide unit including a support extending toward an outside of the passenger compartment from the pillar trim and another end guide unit that extends upward toward the inside of the passenger compartment via a hinge at an end of the support and is connected at an end thereof with the end of the airbag guide via the hinge, and an underside guide unit that is connected at its proximal end with the pillar and includes a contact at an end thereof which is able to be in sliding contact with the under surface of the airbag guide.

6. The disposition structure for the curtain airbag system according to claim 3, wherein the airbag guide support includes an end guide unit including a support extending toward an outside of the passenger compartment from the pillar trim and another end guide unit that extends upward toward the inside of the passenger compartment via a hinge at an end of the support and is connected at an end thereof with the end of the airbag guide via the hinge, and an underside guide unit that is connected at its proximal end with the pillar and includes a contact at an end thereof which is able to be in sliding contact with the under surface of the airbag guide.

7. The disposition structure for the curtain airbag system according to claim 4, wherein the end guide unit and the airbag guide are formed integrally with the pillar trim.

8. The disposition structure for the curtain airbag system according to claim 5, wherein the end guide unit and the airbag guide are formed integrally with the pillar trim.

9. The disposition structure for the curtain airbag system according to claim 6, wherein the end guide unit and the airbag guide are formed integrally with the pillar trim.

10. The disposition structure for the curtain airbag system according to claim 1, wherein the airbag guide support includes an end guide unit including a support extending toward an outside of the passenger compartment from the pillar trim.

11. The disposition structure for the curtain airbag system according to claim 10, wherein the airbag guide support further includes another end guide unit that extends upward toward the inside of the passenger compartment via a hinge at an end of the support.

12. The disposition structure for the curtain airbag system according to claim 11, wherein an end of said another end guide unit is connected with the end of the airbag guide via the hinge.

13. The disposition structure for the curtain airbag system according to claim 12, wherein the airbag guide support further includes an underside guide unit that is connected at its proximal end with the pillar.

14. The disposition structure for the curtain airbag system according to claim 13, wherein the underside guide unit includes a contact at an end thereof which is able to be in sliding contact with the under surface of the airbag guide.

15. The disposition structure for the curtain airbag system according to claim 10, wherein the end guide unit and the airbag guide are formed integrally with the pillar trim.

16. The disposition structure for the curtain airbag system according to claim 10, wherein the airbag guide support further includes another end guide unit that extends upward toward the inside of the passenger compartment.

17. The disposition structure for the curtain airbag system according to claim 16, wherein the airbag guide support further includes an underside guide unit that is connected at its proximal end with the pillar.

* * * * *